Feb. 10, 1925.
C. M. HOSE
1,525,447
APPARATUS FOR ELEVATING AUTOMOBILES
Filed Nov. 30, 1923
4 Sheets-Sheet 4
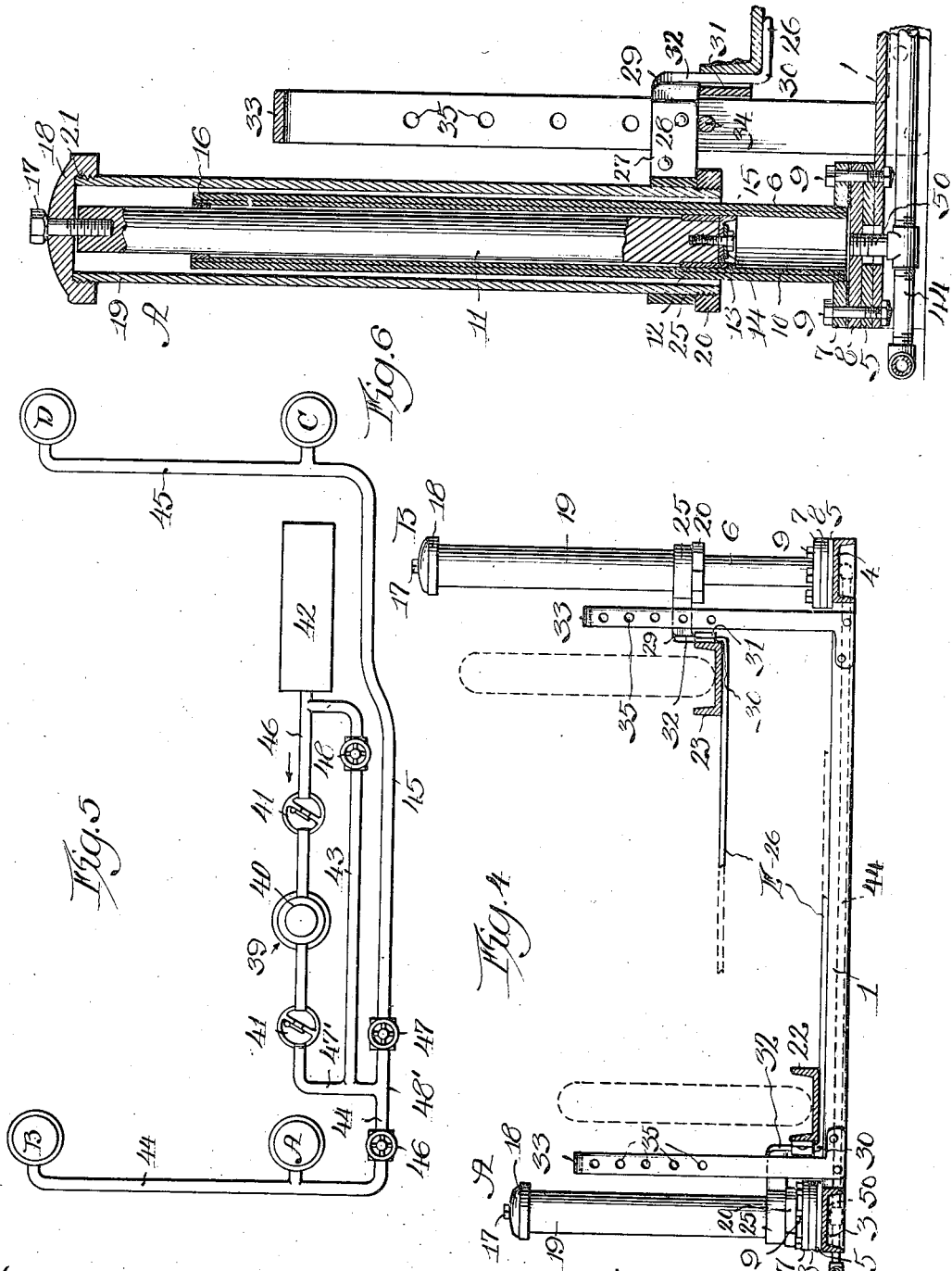

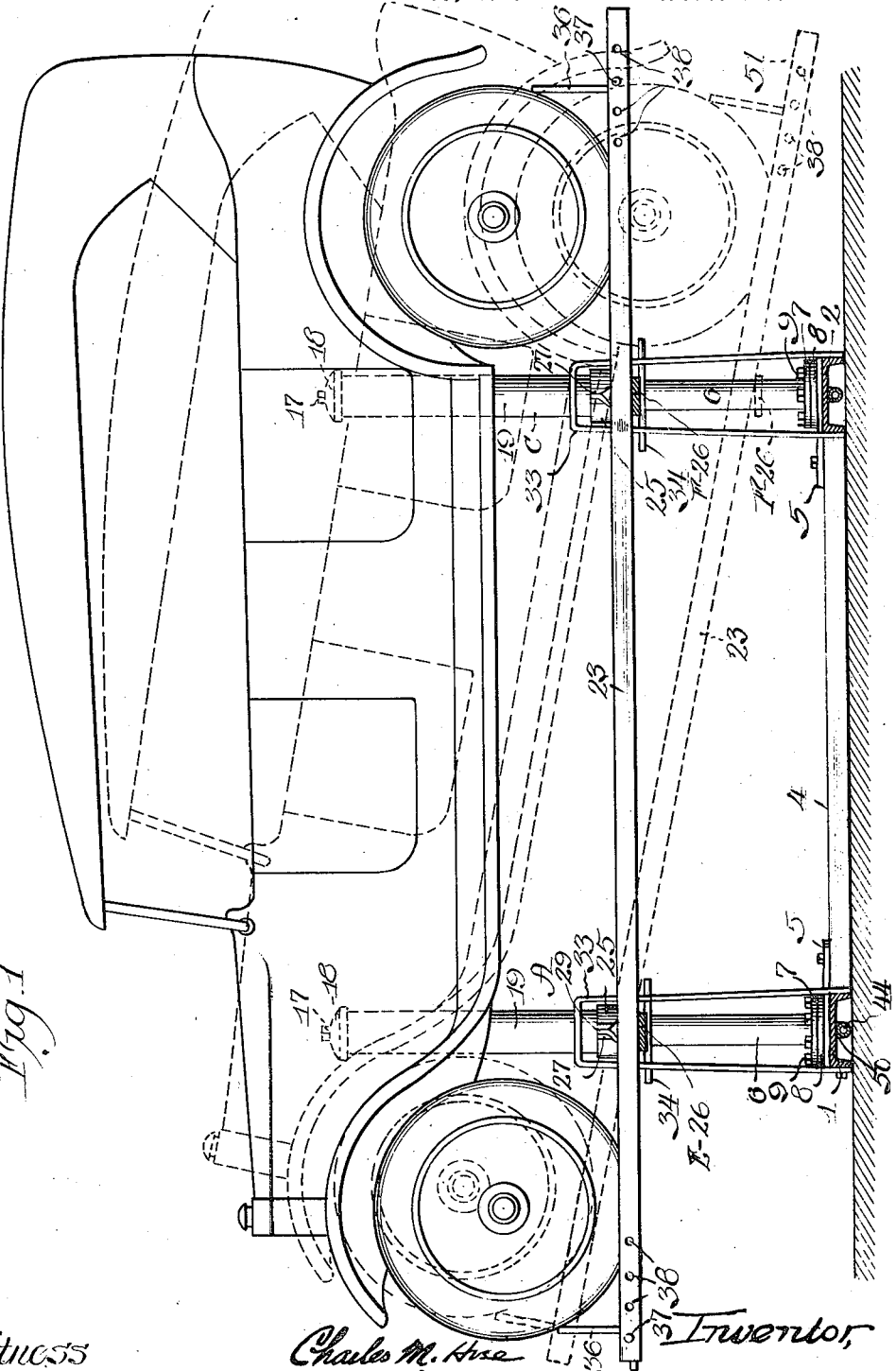

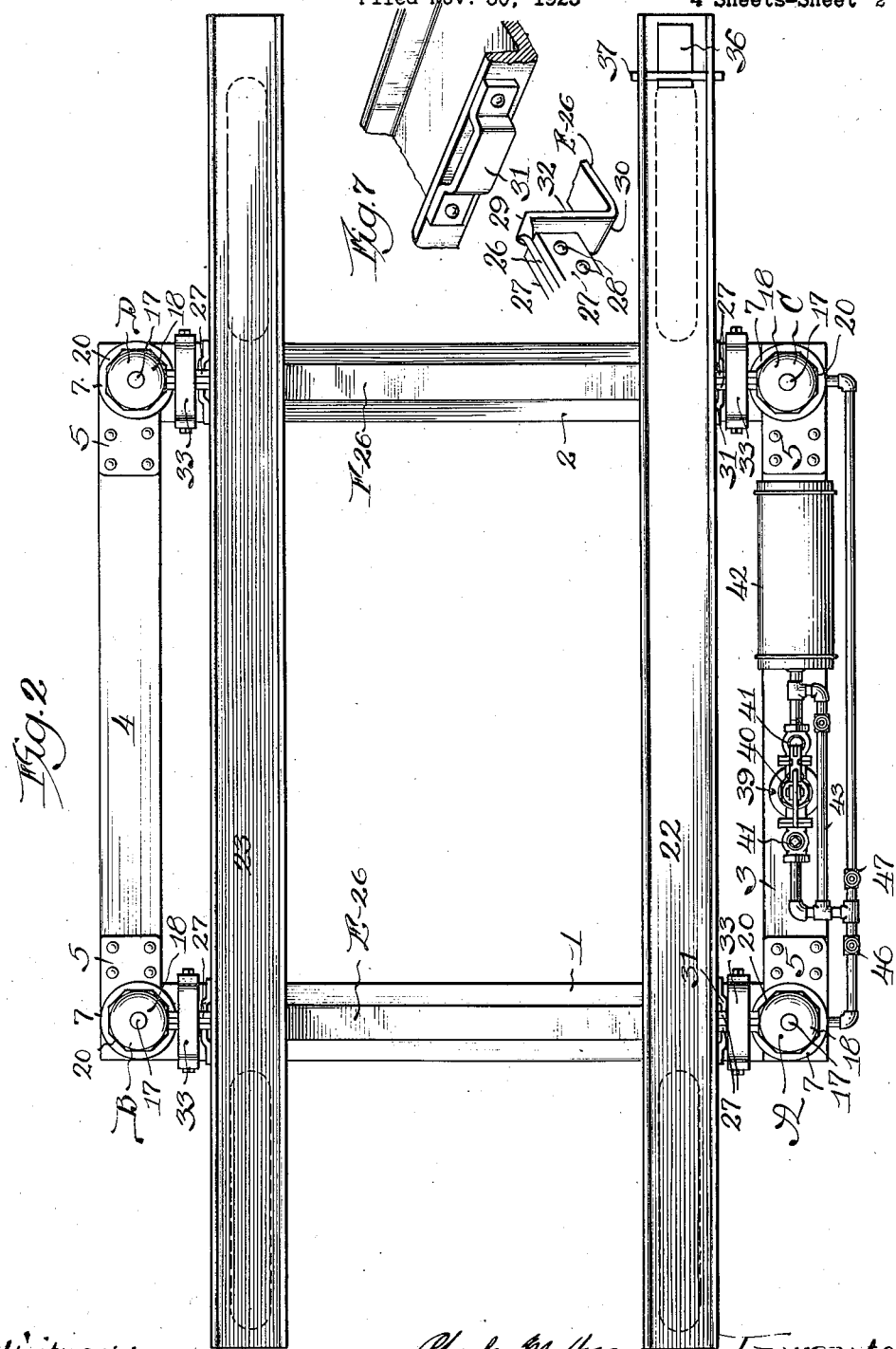

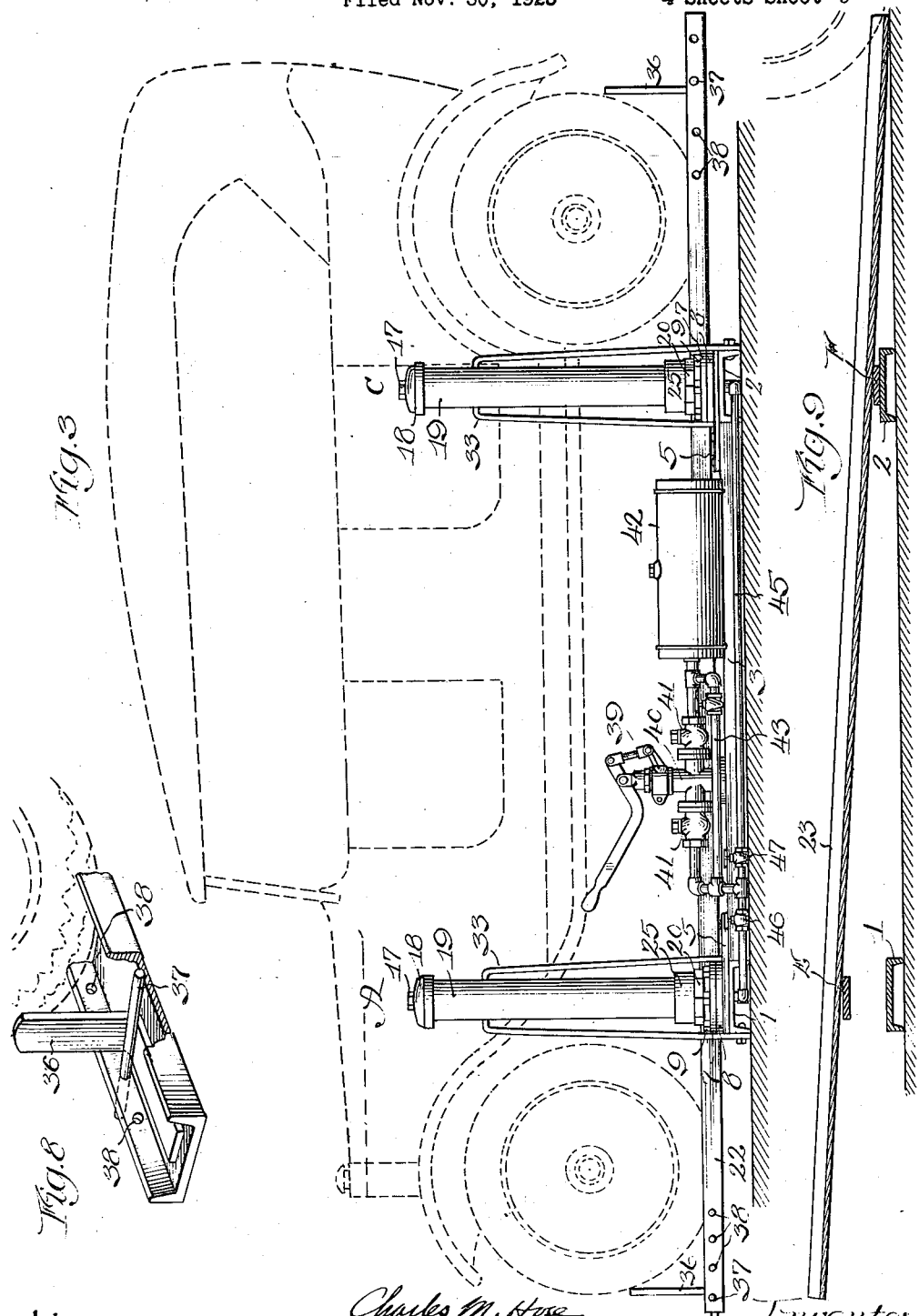

Patented Feb. 10, 1925.

1,525,447

UNITED STATES PATENT OFFICE.

CHARLES M. HOSE, OF RIVER FOREST, ILLINOIS.

APPARATUS FOR ELEVATING AUTOMOBILES.

Application filed November 30, 1923. Serial No. 677,610.

*To all whom it may concern:*

Be it known that I, CHARLES M. HOSE, a citizen of the United States, residing at 68 Lake St., River Forest, in the county of Cook and State of Illinois, have invented certain new and useful Improvements in Apparatus for Elevating Automobiles, of which the following is a specification.

My invention is an improvement in apparatus for elevating automobiles for the purpose of rendering the under parts of the same accessible for inspection and repairs. I am aware that structures of this kind have previously been designed to operate by means of hydraulic cylinders. By my improved structure I have avoided the necessity of sinking the elevators or lift cylinders below the level of the floor upon which the automobile is driven; I have increased the stability of the apparatus by restraining the supports upon which the automobile rests against horizontal movement, such restraint acting horizontally opposite or substantially opposite the lowermost part of the wheels in all positions of the automobile; I have further increased the stability of the apparatus by keeping the points of support of the automobile at all times below the tops of the lift cylinders, though certain features of my invention might be utilized while permitting the points of support to rise to a somewhat higher level; and I have dispensed with the necessity of a fixed pedestal for the automobile supporting platform, the automobile being supported during raising and lowering solely by the lift cylinders, manually operable stops being provided merely for the purpose of relieving the cylinders from pressure after the car has been raised to the desired horizontal or inclined position. Other advantages and functions of my improved apparatus will appear more clearly in connection with the following description and claims and the drawings forming part of this application, in which—

Figure 1 is a sectional side elevation of my improved apparatus with an automobile thereon, the plane of the section being just outside of the platform channel iron on the side from which the view is taken. The automobile and apparatus are shown in solid lines in elevated horizontal position, and in dotted lines in inclined position, in this latter position the rear end being only slightly elevated and the forward end being elevated to a greater height than when the car is raised in a horizontal position.

Figure 2 is a plan view of the apparatus.

Figure 3 is a side elevation of the structure, with an automobile thereon, the platform being in its lowermost position.

Figure 4 is a transverse sectional elevation, the platform being shown in its lowermost position at the left-hand side and in an elevated position at the right-hand side.

Figure 5 is a diagrammatic view of the pipe connection and valves between the pump, cylinders, and tank for oil or water.

Figure 6 is a longitudinal sectional view of one of the lift cylinders and adjacent parts forming one of the four hoists.

Figure 7 is a detail perspective view, with the parts separated, of the structure by which the platform is connected to its supports.

Figure 8 is a detail perspective view of a stop or block for preventing the automobile from rolling when on the platform, and of part of one of the platform channels.

Figure 9 is a fragmentary longitudinal elevation showing the position of the platform when a car is to be placed upon the same or removed therefrom.

The apparatus illustrated in the drawing comprises a platform having channel iron tracks upon which the automobile is driven or rolled, and four hydraulic hoist cylinders. Many of the advantages of my invention, however, may be utilized in a structure comprising only two cylinders, corresponding to the forward or rear pair of cylinders shown in the drawings, and designed to raise one end only of an automobile. While the particular construction illustrated in the drawings is not in all respects essential to the application of my invention I will describe that construction in detail as an embodiment of my invention which I have found satisfactory and efficient in actual use. It will be obvious, however, that many variations in mechanical form are included within the principle of my invention as described herein and as set forth in the claims.

The base of the apparatus comprises two transverse channel irons 1 and 2, each of the channels having a hydraulic hoist mounted at each end thereof, the letters A, B, C and D being applied to the hoists to designate all of the mechanism thereof collectively, numerals being employed to designate the individual parts. The channels 1, 2 are tied together by longitudinal channel irons 3, 4. Short plates 5, bolted respectively to the longitudinal and transverse channels are used to connect these parts.

One of the hoists is shown in longitudinal section in Figure 6 together with the adjacent parts of the structure. The cylinder 6 is threaded at its lower end into a flange 7. The lower end of the cylinder is closed by a plate 8, the latter being seated on the plate 5, which in turn is seated on the upper surface of the channel 1. The flange 7 and plate 8 may conveniently be the standard steam fittings known respectively as a flange and a blind flange. Bolts 9 passing through bolt holes in the parts 7, 8, 5 and the web of the channel 1 hold the cylinder securely in upright position. The cylinders of all four of the hoists are similarly mounted at the ends of the channels 1 and 2. In order to use standard pipe for the cylinders 6 without the expense of finishing the inside of the pipe, I have shown the cylinders provided with brass lining sleeves 10, the cost of applying accurately finished brass sleeves being much less than that of machining the inside of iron pipe. The plunger 11 is of less diameter than the bore of the lining sleeve 10. The piston at the lower end of the plunger consists of a sleeve 12 secured to the plunger, the exterior of the sleeve 12 having an accurate working fit with the cylinder lining 10. A cup leather is secured by a stud bolt 15 and spreader plate 14 to the lower end of the plunger, the sleeve 12 and cup leather 13 together forming the piston from which the plunger 11 extends upward forming part of the platform supporting and raising member. In order to accurately guide the plunger in a vertical path of movement I secure a sleeve 16 in the upper end of the cylinder lining 10, the interior of this sleeve having an accurate working fit with the plunger. Secured to the top of the plunger 11 by a stud bolt 17 is a member 18 having an internal thread 21 in its under side of sufficient diameter to receive a threaded pipe 19 that will pass over and have a loose working fit on the exterior of the cylinder 6. The member 18 may be an ordinary steam fitting cap of proper size. The pipe 19 is threaded into the cap 18 and extends downwardly to a point preferably just opposite the piston 12, and at its lower end is provided with an exteriorly projecting flange 20. The flange 20 may conveniently consist of a steam fitting locknut threaded upon the lower end of the pipe 19 as illustrated. In operation the load is applied, as hereinafter more fully described, upon the upper surface of the flange 20. The plunger 11, cap 18 and pipe 19 with its flange 20 together constitute a supporting member or suspended which extends upward from the piston on the inside of the cylinder and downward on the outside of the cylinder to a point preferably opposite the piston, the load being applied at the flange 20. The purpose of this construction is to keep the point of application of the vertical load as low as possible, and also to provide for transmitting horizontally acting forces to the cylinder at a correspondingly low point. Owing to the very slight clearance between the outside of the cylinder 6 and the inside of the pipe 19 any horizontal side thrust acting at the flange 20, where the load is applied will be resisted by contact of the inside of the lower end of the pipe 19 with the outer surface of the cylinder 6. The upper part of the plunger 11 is thus relieved of all horizontal stresses and performs only the function of sustaining the vertical load. Avoidance of horizontal strains upon the upper end of the plunger remote from the point of attachment of the cylinder to the base with the resulting necessity of transmitting such stresses from the plunger to the cylinder is an important feature of my invention, and the structure which is utilized for this purpose also serves to bring the automobile support substantially to the level of the floor when lowered, and effects this latter purpose without the necessity of sinking the cylinders below the floor level. All four of the hoists A, B, C, and D are constructed as above described.

Channel irons 22, 23 form the platform upon which the automobile is driven and supported. These channels rest upon cross members designated generally by the letters E and F, the individual parts of these members being designated by numerals. Each of the members E, F is provided at its ends with sleeves 25, 25 which surround the pipes 19 of one of the pairs of hoists and rest upon the flanges 20. The sleeves 25 are shown as formed separately from the central parts E—26, F—26 of the cross members, and consisting of a strip of metal bent to conform to the exterior of the pipe 19 and with projecting ends between which the ends of the central parts 26 of the cross members are received and secured by rivets 28, each of the parts 26 with the sleeves 25 at its ends forming a single rigid cross member. Each of the parts 26 is shown as being formed from a flat strip which is given a quarter twist and bent downwardly at 29 just beyond the projecting ends of the ring 25, and bent again at 30 to form the horizontal central portion of the cross member. Metal loops 31 riveted to the outer sides of the channels 22, 23 surround the vertical parts 32 of the cross members and serve to hold the channels in place transversely, the length of the loops being sufficient to permit endwise movement of the channels relative to cross members to the extent resulting when the car is adjusted to an inclined position as shown in dotted lines in Figure 1.

In order to hold the platform in elevated position independently of the hoists I have provided four stationary pedestals 33, one just inside of each of the hoists. Each pedestal consists of two arms spaced apart, the two arms being joined at the top and the lower free ends of the arms of each pedestal being riveted to opposite sides of one of the base members 1, 2. The cross-members E and F pass between the arms of the pedestals and pins 34 (shown in Figure 1) passing through apertures 35 in the arms of the pedestals beneath the end parts of the cross members serve to support the weight of the platform and car independently of the hoists. The loops formed at the top of the pedestals 33 serve as stops to limit the upward movement of the cross members E, F. In order to block the wheels of the car I provide four stops 36, each consisting of a base and a stop arm projecting upwardly therefrom. A series of apertures 38 is formed in the flanges at each end of each of the platform channels 22, 23 and pins 37, as shown in Figures 2 and 8 serve to hold the stops in place.

Any suitable pump may be used for forcing fluid into the cylinders beneath the pistons to raise the car and either air or a liquid such as oil or water may be used. I have in the drawings shown a pump 39 of a type suitable for use with water or oil. Instead of using a pump directly, water or oil under sufficient head or air drawn from a reservoir under sufficient pressure may of course be used. The pump illustrated comprises the cylinder 40 and check valves 41. The pipe connections are most clearly shown in Figure 5. A pipe 46 leads from the water or oil tank 42 to the intake side of the pump. The outflow pipe 47' of the pump divides at 48', one branch leading through hand valve 46 and pipe 44 to the hoists A and B and the other branch leading through the hand valve 47 and pipe 45 to the hoists C and D. A by-pass, in which there is a hand valve 48, leads from the outflow pipe 47 directly back to the tank 42. The manner of connecting the pipes with the cylinders is shown in detail in Figure 6, branch pipes 50 being threaded into apertures in the blind flanges 8 which I have used to close the lower ends of the cylinders. The pipes are preferably placed in the troughs beneath the webs of the channels 1, 2, 3 and 4, suitable openings being provided in the webs of the channels and in the plates 5 for the connections with the pumps and hoists. In this position the pipes are protected from injury and offer a minimum of obstruction.

Upon reference to Figure 4, where the hoist A is shown in its lowermost position, it will be observed that when in this position the central part E—26 of the cross member rests on the channel base member 1, the downwardly extending part 32 of the cross-member being of just sufficient length to effect this purpose. In this position the upper surfaces of the channel platform members 22 and 23 upon which the automobile is to be driven or rolled by hand are elevated above the floor only to the extent of the depth of the side flanges of the channels 1 and 2 and the thickness of the web of the platform channels 22, 23. Small inclines might be used to facilitate driving the car upon the platform channels 22, 23, but this is unnecessary as will be observed from the position of the platform shown in Figure 9, where the left-hand end of the platform is shown as having been elevated while leaving the right-hand end at its lowermost level, thus causing the platform to tilt sufficiently to bring the projecting right-hand end down to the level of the floor in which position the only resistance offered to the movement of a car is the negligible thickness of the webs of the platform channels. For the purpose of adjusting the platform to the position shown in Figure 9 the valves 47 and 48 are closed and the valve 46 is opened. Operation of the pump then raises the hoists A and B without affecting the hoists C and D, the left-hand ends of the platform channels being thus raised and the right hand ends depressed upon the cross member F as a fulcrum. After the car has been placed on the platform and blocked in place the valve 47 may be opened and the pumping continued until the car has been raised to the desired level. If on account of starting from the inclined position shown in Figure 9 or from any other cause the car occupies an inclined position during its upward movement it will automatically assume a horizontal position at the upper limit of its movement, which upper limit is fixed by the engagement of the cross members E and F with the upper ends of the loops formed by the pedestals 33. For instance, if the left-hand end of the platform, as viewed in Figure 1, reaches its upward limit of movement before the right-hand end it will simply be brought to rest by engagement of the cross member with the loops at the upper ends of the left-hand pedestals and all of the water or oil thereafter pumped will flow into the cylinders of the hoists C, D thereby raising the right-hand end of the platform until it also has reached its upper limit of movement. The car may be leveled or adjusted to any desired inclined position at any point in its upward movement by shutting off the flow of oil to either pair of hoists, which may be done by closing one of the valves 46, 47 and leaving the other open, whereupon continuation of pumping will raise one end of the car only. In Figure 1 I have shown in solid lines the platform and car at the maximum elevation in a horizontal position. If when the car is in this position the valve 46 controlling the forward hoists, A and B, be closed, and the valve 47, controlling the rear hoists C and D, and the by-pass valve 48 be opened the rear end of the platform and car will move downward, forcing the oil or water from the cylinders of hoists C and D into the tank 42, these cylinders acting as dash-pots during this movement and the descent of the rear of the car being made as slow as desired by restricting the opening of the valve 47 or 48. This movement takes place on the then stationary cross member E—26 as a fulcrum and has the effect of raising the forward part of the car to a higher elevation than when the car is raised to the limit of height in a horizontal position. The inclined position of the car shown in dotted lines in Figure 1 can, of course, be brought about also by starting with the car in its lowermost position, raising the rear end just sufficiently to keep the right-hand ends 51 of the platform channels 22, 23 clear of the floor when the opposite ends are raised to maximum elevation, and then raising the opposite ends to their limit of height. If the car be raised to a point short of its maximum elevation at both ends, the valves 46 and 47 being open and the valve 48 closed, a man's weight at either end of the car will depress that end and raise the opposite end if the car is so positioned on the platform as to distribute its weight substantially equally between the two pairs of hoists A, B and C, D, the oil or water during this operation simply being forced from one pair of cylinders to the other.

I claim as my invention:

1. In an apparatus for raising automobiles above the floor level, a platform, a base at the floor level, a plurality of fluid-operable elevators mounted on said base adjacent the ends thereof and constituting the sole support of said platform, each of said elevators comprising a member fixed to said base and a vertically movable member, one of said members being a cylinder and the other a piston operable therein, said movable members having platform suspenders extending downwardly upon the exterior of said fixed members substantially to said base, when said movable members are in lowermost position, and said platform being supported upon the lowermost part of said suspenders with limited freedom of movement horizontally between said platform and suspenders, means for supplying fluid under pressure to all of said elevators simultaneously and to part thereof separately, whereby said platform may be maintained in a horizontal position throughout its rising movement or may be raised to a greater extent at either end than at the opposite end.

2. In an apparatus of the class described, a platform, a base at the floor level, a plurality of fluid-operable elevators mounted on said base adjacent the ends thereof and constituting the sole support of said platform, each of said elevators comprising a member fixed to said base and a vertically movable member, one of said members being a cylinder and the other a piston operable therein, said movable members having platform suspenders extending downwardly upon the exterior of said fixed members substantially to said base, when said movable members are in lowermost position, and said platform being supported upon the lowermost part of said suspenders, means for supplying fluid under pressure to all of said elevators simultaneously and to part of them separately and for releasing fluid from all of said elevators simultaneously and from part of them separately, whereby said platform may be maintained in a horizontal position throughout its rising and lowering movement or may be elevated or depressed at either end to a greater extent than at the opposite end.

3. In an apparatus for raising automobiles above the floor level, a platform, a base at the floor level, a plurality of fluid-operable elevators mounted on said base adjacent the ends thereof and constituting the sole support of said platform, each of said elevators comprising a member fixed to said base and a vertically movable member, one of said members being a cylinder and the other a piston operable therein, said movable members having platform suspenders extending downwardly upon the exterior of said fixed members substantially to said base, when said movable members are in lowermost position, and said platform being supported upon the lowermost part of said suspenders with limited freedom of movement horizontally between said platform and suspenders, means for supplying fluid under pressure to all of said elevators simultaneously and to part thereof separately, whereby said platform may be maintained in a horizontal position throughout its rising movement or may be raised to a greater extent at either end than at the opposite end, stationary pedestals adjacent said elevators, stops vertically adjustable in said pedestals and cooperating with the movable members of said elevators to maintain said platform in adjusted position independently of the pressure of said fluid.

4. In an apparatus of the class described, a platform, a base at the floor level, a plurality of fluid-operable elevators mounted on said base adjacent the ends thereof and constituting the sole support of said platform, each of said elevators comprising a member fixed to said base and a vertically movable member, one of said members being a cylinder and the other a piston operable therein, said movable members having platform suspenders extending downwardly upon the exterior of said fixed members substantially to said base, when said movable members are in lowermost position, and said platform being supported upon the lowermost part of said suspenders, means for supplying fluid under pressure to all of said elevators simultaneously and to part of them separately and for releasing fluid from all of said elevators simultaneously and from part of them separately, whereby said platform may be maintained in a horizontal position throughout its rising and lowering movement or may be elevated or depressed at either end to a greater extent than at the opposite end, stationary pedestals adjacent said elevators, stops vertically adjustable in said pedestals and cooperating with the movable members of said elevators to maintain said platform in adjusted position independently of the pressure of said fluid.

In testimony whereof, I have subscribed my name.

CHARLES M. HOSE.